United States Patent
Park et al.

(10) Patent No.: US 9,992,454 B2
(45) Date of Patent: Jun. 5, 2018

(54) MONITORING BLIND SPOT USING MOVING OBJECTS

(71) Applicant: KT CORPORATION, Gyeonggi-do (KR)

(72) Inventors: Se-Zoo Park, Gyeonggi-do (KR); Chul-Hyun Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 413 days.

(21) Appl. No.: 14/454,920

(22) Filed: Aug. 8, 2014

(65) Prior Publication Data
US 2015/0042815 A1 Feb. 12, 2015

(30) Foreign Application Priority Data
Aug. 8, 2013 (KR) .................. 10-2013-0094434

(51) Int. Cl.
*H04N 7/18* (2006.01)

(52) U.S. Cl.
CPC .................. *H04N 7/181* (2013.01)

(58) Field of Classification Search
CPC .................................................. G06T 1/00
See application file for complete search history.

(56) References Cited

U.S. PATENT DOCUMENTS

| 6,741,250 B1 * | 5/2004 | Furlan | G06T 19/003 345/427 |
| 7,460,148 B1 | 12/2008 | Clark et al. | |
| 7,590,261 B1 * | 9/2009 | Mariano | G06K 9/00785 382/103 |
| 2003/0053659 A1 * | 3/2003 | Pavlidis | G06K 9/00335 382/103 |
| 2004/0139470 A1 | 7/2004 | Treharne | |
| 2006/0004486 A1 * | 1/2006 | Yoshikawa | B60W 50/14 700/245 |
| 2006/0125919 A1 * | 6/2006 | Camilleri | B60R 1/00 348/148 |
| 2006/0152592 A1 * | 7/2006 | Chishima | H04B 7/26 348/211.3 |
| 2006/0197839 A1 * | 9/2006 | Senior | H04N 5/232 348/169 |
| 2006/0291695 A1 * | 12/2006 | Lipton | G06K 9/00771 382/103 |
| 2008/0062255 A1 * | 3/2008 | Gal | G08B 13/19628 348/37 |

(Continued)

FOREIGN PATENT DOCUMENTS

| JP | 2002-183620 A | 6/2002 |
| JP | 2011-232877 A | 11/2011 |

(Continued)

*Primary Examiner* — Jay Patel
*Assistant Examiner* — Marnie Matt
(74) *Attorney, Agent, or Firm* — IP Legal Services, LLC (57) ABSTRACT

Provided is a method of monitoring a blind spot of stationary monitoring devices in a target monitoring area using at least one moving object. The method may include detecting at least one moving object located near to a blind spot of stationary monitoring devices in a target monitoring area upon generation of a predetermined initiation event, and monitoring the blind spot of the stationary monitoring devices using a monitoring device mounted on the detected at least one moving object.

18 Claims, 8 Drawing Sheets

(56) References Cited

U.S. PATENT DOCUMENTS

| | | | |
|---|---|---|---|
| 2008/0129844 A1* | 6/2008 | Cusack | H04N 5/232 348/241 |
| 2008/0291278 A1* | 11/2008 | Zhang | G06K 9/00771 348/159 |
| 2009/0219393 A1* | 9/2009 | Vian | G07C 5/008 348/144 |
| 2009/0293110 A1 | 11/2009 | Koga | |
| 2010/0225471 A1 | 9/2010 | Kawamoto et al. | |
| 2010/0327057 A1 | 12/2010 | Medina et al. | |
| 2011/0119716 A1 | 5/2011 | Coleman, Sr. | |
| 2011/0193965 A1 | 8/2011 | Kim | |
| 2012/0002047 A1* | 1/2012 | An | H04N 7/15 348/143 |
| 2012/0046044 A1* | 2/2012 | Jamtgaard | G01S 3/7864 455/456.1 |
| 2012/0154522 A1* | 6/2012 | Yoo | H04N 5/232 348/36 |
| 2012/0191407 A1 | 7/2012 | Kim et al. | |
| 2012/0206275 A1* | 8/2012 | Mauderer | G01S 13/931 340/901 |
| 2012/0330453 A1* | 12/2012 | Samak Sangari | B25J 9/1697 700/121 |
| 2013/0046847 A1* | 2/2013 | Zavesky | G06Q 30/0261 709/217 |
| 2013/0116859 A1* | 5/2013 | Ihlenburg | G06F 17/00 701/2 |
| 2013/0265423 A1* | 10/2013 | Bernal | G06Q 30/0284 348/148 |
| 2014/0197232 A1 | 7/2014 | Birkler et al. | |
| 2014/0279707 A1* | 9/2014 | Joshua | G06Q 30/0283 705/400 |

FOREIGN PATENT DOCUMENTS

| | | |
|---|---|---|
| KR | 10-2010-0119920 A | 11/2010 |
| KR | 10-2010-0132693 A | 12/2010 |
| KR | 10-1026631 B1 | 4/2011 |
| KR | 101026631 B1 * | 4/2011 |
| KR | 10-2011-0060342 A | 6/2011 |
| KR | 10-1038370 B1 | 6/2011 |
| KR | 101038370 B1 * | 6/2011 |
| KR | 10-2012-0035353 A | 4/2012 |
| KR | 101142933 B1 * | 5/2012 |
| KR | 10-2012-0085078 A | 7/2012 |
| KR | 10-2012-0090117 A | 8/2012 |
| KR | 10-2013-0015626 A | 2/2013 |
| KR | 10-1262355 B1 | 5/2013 |
| KR | 10-2013-0072790 A | 7/2013 |

* cited by examiner

MONITORING BLIND SPOT USING MOVING OBJECTS

CROSS REFERENCE TO PRIOR APPLICATIONS

The present application claims priority under 35 U.S.C. § 119 to Korean Patent Application No. 10-2013-0094434 (filed on Aug. 8, 2103), which is hereby incorporated by reference in its entirety.

BACKGROUND

The present disclosure relates monitoring a blind spot in a public place and, more particularly, to monitoring a blind spot by sharing at least one personal camera of service members.

Many surveillance cameras have been installed at public places for various reasons, such as a security purpose. However, such surveillance cameras are immovable and fixed at predetermined locations. Accordingly, a target monitoring area includes at least one blind spot. Such blind spots are often used for crimes.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a blind spot in a public area may be effectively monitored through communication with moving objects.

In accordance with another aspect of the present embodiment, a blind spot may be monitored using a camera mounted on a moving object located near to the blind spot.

In accordance with still another aspect of the present embodiment, a blind spot may be monitored using at least one personal camera of a service member.

In accordance with yet another aspect of the present embodiment, a method may be provided for monitoring a blind spot using a moving object in a target monitoring area by a service server. The method may include detecting at least one moving object located near to a blind spot in a target monitoring area upon generation of a predetermined initiation event and monitoring the blind spot using a monitoring device mounted on the detected at least one moving object.

The method may further include monitoring the target monitoring area using stationary monitoring devices and determining whether the predetermined initiation event is generated based on first monitoring result received the stationary monitoring device.

The determining may include determining the predetermined initiation event is generated when a target object to monitor is located at the blind spot based on analysis of images captured by the stationary monitoring devices. The determining may include determining the predetermined initiation event is generated when a predetermined signal generated from a target object is detected based on analysis of images captured by the stationary monitoring devices. The determining may include obtaining location information of the blind spot in the target monitoring area, receiving location information of a target object to monitor, and determining the predetermined initiation event is generated when the target object is located at the blind spot based on comparison of the obtained location of the blind spot and the received location information of the target object.

The detecting at least one moving object may include collecting information on the at least one moving object located in the target monitoring area, extracting current location information of the at least one moving object from the collected information, obtaining information on a current location of a target object to monitor based on images captured from stationary monitoring devices installed in the target monitoring area when the target object is determined to be located at the blind spot, and detecting at least one moving object located near to the target object to monitor as the at least one moving object located near to the blind spot.

The collected information on the moving object may include information on at least one of identification, a current location, a monitoring device mounted on the moving object, and an operation status.

The monitoring may include transmitting a monitoring signal to the detected at least one moving object and receiving monitoring results from the detected at least one moving object in response to the monitoring signal. The monitoring signal may include information on a target object to monitor, a target blind spot to monitor, a monitoring time duration, and a destination to provide monitoring results. The monitoring results may include at least one of images, moving images, audio data, temperature data, and vibration data, captured and sensed through various devices of the detected at least one moving object.

The method may include receiving the monitoring result from the detected at least one moving object and outputting the received monitoring result through constituent elements of the service server.

The method may further include receiving the monitoring result from the detected at least one moving object and transmitting the received monitoring result to a designated device through a communication network.

The monitoring may include transmitting a signal to control a camera of the detected at least one moving object to capture images of activities occurring in the blind spot to the detected at least one moving object and receiving images captured by the camera of the detected at least one moving object and transmitted from the detected at least one moving object in response to the signal.

After the monitoring, the method may include determining whether a predetermined activity occurs in the blind spot based on the monitoring result of monitoring the blind spot and transmitting a control signal to the detected at least one moving object when the predetermined activity occurs in the blind spot. The determining whether a predetermined activity occurs may include analyzing images of activities occurring in the blind spot, captured by a camera of the detected at least one moving object and transmitted from the detected at least one moving object.

The transmitting a control signal may include controlling a camera mounted on the detected at least one moving object to capture images of activities occurring in the blind spot through the control signal.

In accordance with at least one embodiment, a method may be provided for monitoring a blind spot in a target monitoring area by a moving object in the target monitoring area. The method may include monitoring a blind spot of a target monitoring area in response to a signal from a service server for monitoring the target monitoring area and transmitting the monitoring result to a designated device.

The monitoring may include receiving a monitoring signal from the service server, obtaining monitoring information from the received monitoring signal, and controlling a camera mounted on the moving object to capture images of activities occurring in the blind spot based on the obtained monitoring information.

The monitoring may include receiving a control signal from the service server, obtaining controlling information from the received control signal, and controlling at least one constituent element of the moving object based on the obtained controlling information.

The method may include establishing a communication link to the service server when the moving object enters the target monitoring area associated with the service server and transmitting information on the moving object to the service server regularly.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a blind spot in a public place such as a parking lot may be effectively monitored using cameras installed in moving objects near to the blind spot. Hereinafter, such a blind spot monitoring service will be described with reference to FIG. 1.

Figure 1:
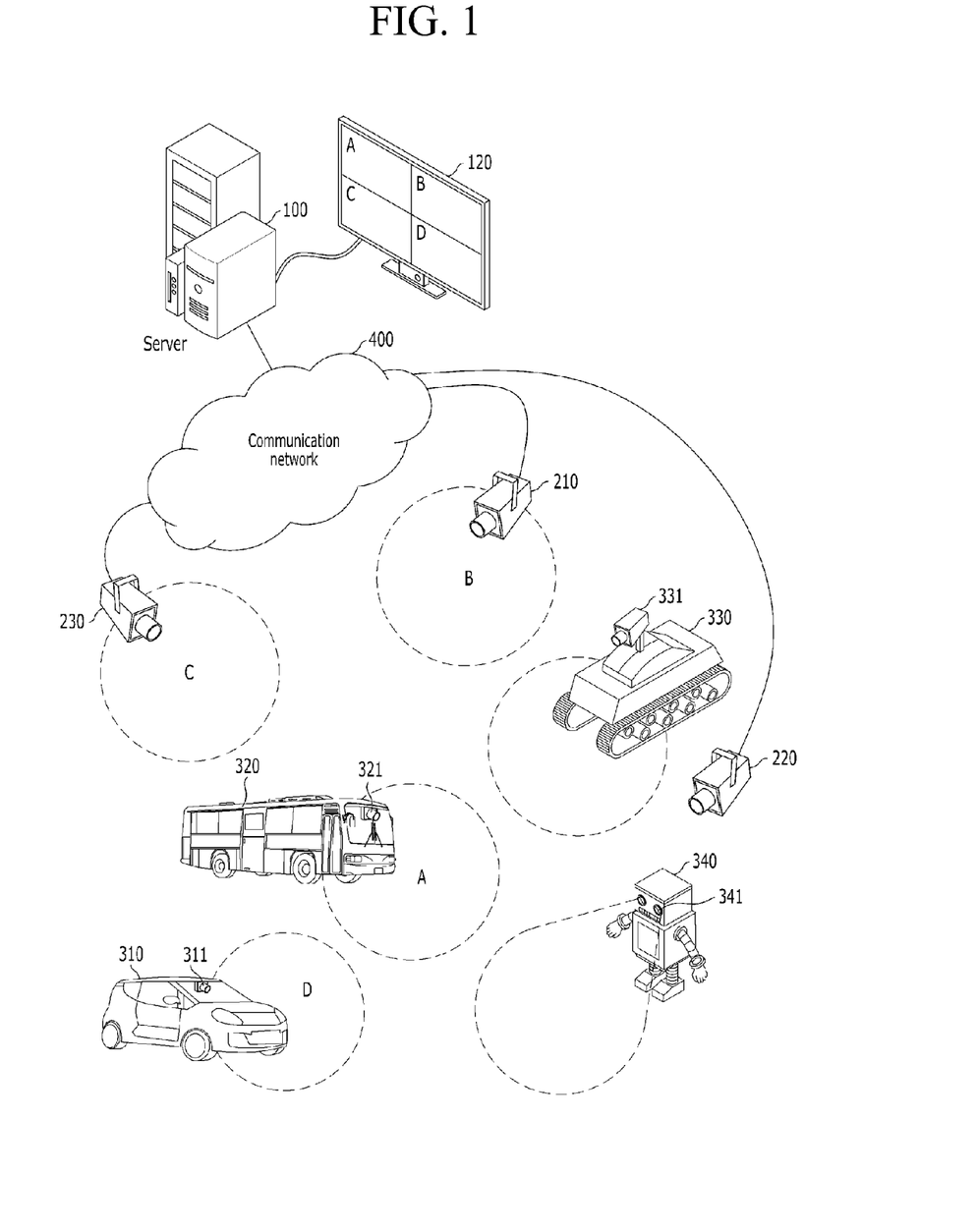
FIG. 1 illustrates monitoring a blind spot in accordance with at least one embodiment.

FIG. 1 illustrates monitoring a blind spot in accordance with at least one embodiment.

Referring to FIG. 1, service server 100 may monitor a blind spot in a public place not only using at least one of stationary monitoring devices 210 to 230 but also using cameras 311 to 341 mounted on moving objects 310 to 340.

Service server 100 may provide monitoring results to a user in accordance with at least one embodiment through displaying images captured through stationary monitoring devices 210 to 230 and cameras 311 to 341 mounted on moving objects 310 to 340. Furthermore, service server 100 may provide such a monitoring result as a blind spot monitoring service to a user through corresponding user equipment in accordance with at least one embodiment. In order to perform such monitoring operation, service server 100 may be coupled with stationary monitoring devices 210 to 230 and moving objects 310 to 340 through communication network 400.

Such service server 100 may be referred to as a control center. Service server 100 may be a computing system for controlling stationary monitoring devices 210 to 230 installed in a public places. For example, service server 100 may control stationary monitoring devices 210 to 230 to obtain information on activities occurring in a designated monitoring area in real time. Service server 100 may provide the obtained information to a designated device. Such obtained information may include image, moving images, sounds, sensed data (e.g., vibration, temperature variation), and so forth. For example, service server 100 may control stationary monitoring devices 210 to 230 to capture images of activities occurring in the designated monitoring area and collect the captured images from stationary monitoring devices 210 to 230. Service server 100 may display the collected images through a display device.

Service server 100 may control moving objects 310 to 340 to obtain information on activities occurring in a target monitoring area (e.g., a blind spot) and collect the obtained information from moving objects 310 to 340 in real time in accordance with at least one embodiment. As described, the obtained information may include image, moving images, sounds, sensed data (e.g., vibration, temperature variation), and so forth. Particularly, service server 100 may collect information on moving objects 310 to 340, such as identification, location, and operation status (e.g., activated, inactivated, power-on, phase, and so forth). Based on the collected information, service server 100 may select moving objects located near to a target monitoring area (e.g., blind spot) and transmit a control signal to the selected moving object. Through such control signals, service server 100 may control the selected moving objects to capture images of activities occurring in the target monitoring area (e.g., a blind spot) using associated cameras 311 to 341 and to transmit the captured images to service server 100.

Furthermore, service server 100 may provide the monitoring result to a designated device after authenticating a service requester. For example, service server 100 may receive a service request message from user equipment of a service requester and perform an authentication procedure based on information included in the service request message. After the service requester is determined as an authorized member, service server 100 may provide a monitoring result of a target monitoring area to the user equipment. The monitoring result may be provided as a form of an image, a moving image, a video stream, and so forth. The user equipment may be an electronic device capable of communicating, displaying, and processing. For example, the user equipment may include a personal computer, a laptop computer, a smart phone, a pad-like device, and a television set.

Service server 100 may enable moving objects 310 to 340 to register for the blind spot monitoring service. That is, service server 100 may receive a registration request message from moving objects 310 to 340 and register the moving objects 310 to 340 as members for the blind spot monitoring service. Particularly, service server 100 may provide software application to member moving objects for communication between service server 100 and the member moving objects. Such provided software application may be installed in moving objects and activated upon generation of a predetermined event in moving objects. Upon the activation, a communication link may be established between service server 100 and a corresponding moving object and data (e.g., a control signal and collected information) may be exchanged through the communication link.

Stationary monitoring devices 210 to 230 may be immovably installed at corresponding locations for monitoring designated areas. For example, stationary monitoring devices 210 to 230 may obtain information on activities occurring in the designated areas and transmit the obtained information to service server 100 in response to control signals from service server 100. Such obtained information may include image, moving images, sounds, sensed data (e.g., vibration, temperature variation), and so forth. Particularly, stationary monitoring devices 210 to 230 may capture images of activities occurring in the designated area and transmit the captured images in a form of a video stream in real time.

Stationary monitoring devices 210 to 230 may be coupled to service server 100 through communication network 400 and communicate with service server 100 through various types of communication schemes. For example, stationary monitoring device 200 may be a surveillance camera including a closed circuit television (CCTV) camera.

Since stationary monitoring devices 210 to 230 are installed at fixed locations, a monitoring area of stationary monitoring devices 210 to 230 may include a blind spot where stationary monitoring devices 210 to 230 cannot directly observe. Such a blind spot may be often used for dangerous illegal activities such as crimes. In order to monitor such a blind spot, service server 100 may control moving objects 310 to 340 having monitoring devices 311 to 341, registered as service members, near to the blind spot to monitor the blind spot in accordance with at least one embodiment.

Moving objects 310 to 340 may be an object capable of travelling one place to the other and capable of communicating with service server 100 in accordance with at least one embodiment. Such moving objects 310 to 340 may include monitoring devices 311 to 341, respectively, for monitoring activities in a designated area. Moving objects 310 to 340 may include a vehicle (e.g., car 310, bus 320, and motor cycle), a specialized movable device (e.g., radio control vacuum 330), and a robot 340, but the present invention is not limited thereto. Hereinafter, for convenience and ease of understanding, moving objects 310 to 340 will be described as a vehicle with a motion camera equipped. However, the present invention is not limited thereto. As described, a moving object may be various types of movable objects capable of communication.

Moving objects 310 to 340 may establish a communication link to service server 100, transmit data to, and receive data from service server 100 through the established communication link. For example, moving objects 310 to 340 may receive control signals from service server 100 and transmit obtained information from a target monitoring area to service server 100. Moving objects 310 to 340 may be registered at service server 100 as a member for a blind spot monitoring service. As a member, moving objects 310 to 340 may allow service server 100 to control monitoring devices 311 to 341 mounted on moving objects 310 to 340, but the present invention is not limited thereto. Furthermore, moving objects 310 to 340 may provide information such as identification, location, and operation status (e.g., activated, inactivated, power-on/off, phase, and so forth), regularly or upon a request.

As described, moving objects 310 to 340 may include monitoring devices 311 to 341, respectively, for obtaining information on activities occurring in a target monitoring area. For example, monitoring devices 311 to 341 capture and transmit images of activities in the target monitoring area, such as a blind spot of stationary monitoring devices 210 to 230. Since stationary monitoring devices 210 to 230 are installed at fixed locations, a blind spot for monitoring may be included in a corresponding monitoring area. In accordance with at least one embodiment, at least one moving object located near to a target blind spot may be determined based on information collected from member moving objects 310 to 340 and the determined moving object may be controlled to collect information on activities in the blind spot.

As described, a blind spot may be effectively monitored using moving objects 310 to 340 in accordance with at least one embodiment. Such operation will be described in brief with reference to FIG. 2.

Figure 2:
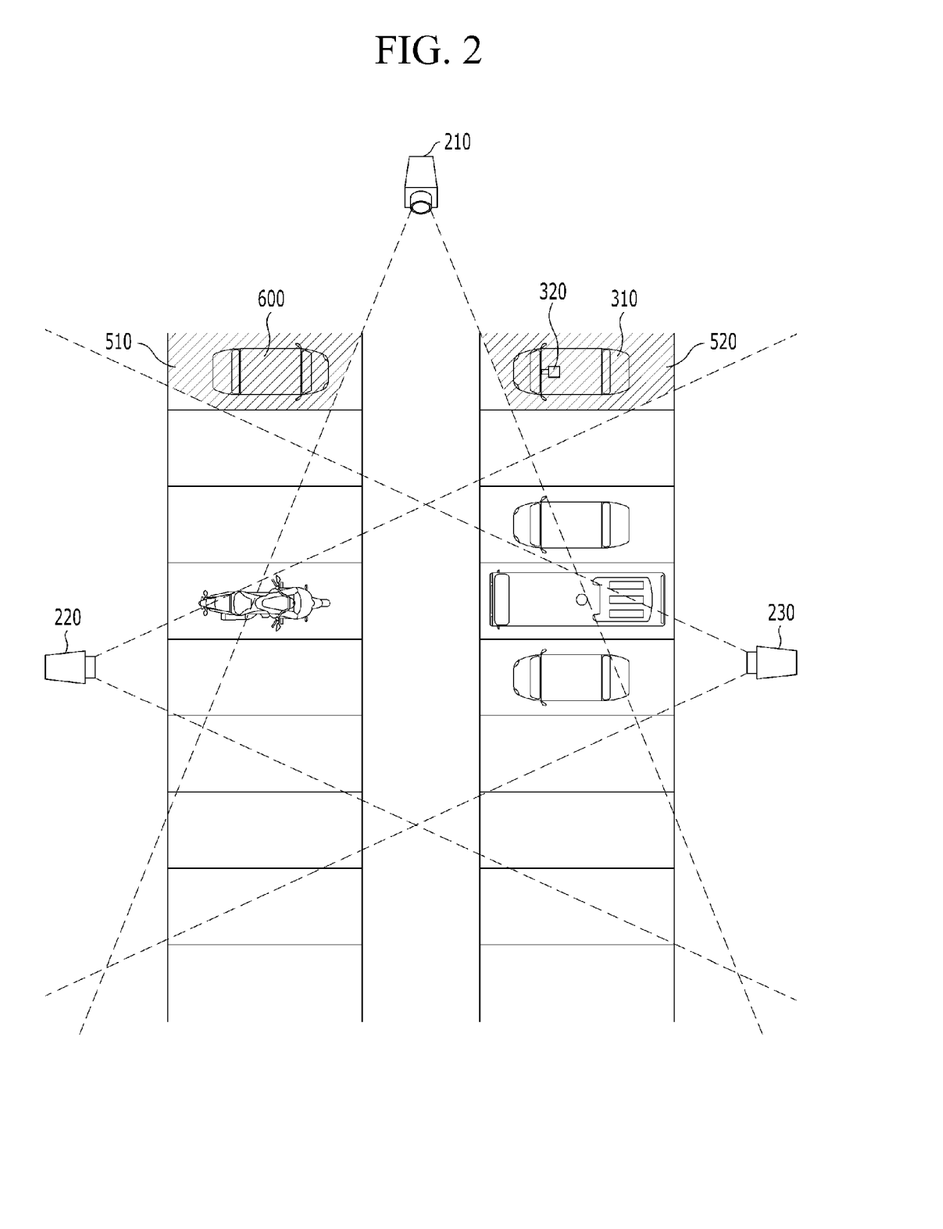
FIG. 2 illustrates monitoring a vehicle parked in a blind spot of a parking lot through a camera mounted on a moving object in accordance with at least one embodiment.

FIG. 2 illustrates monitoring a vehicle parked in a blind spot of a parking lot through a camera mounted on a moving object in accordance with at least one embodiment.

Referring to FIG. 2, a plurality of stationary monitoring devices 210 to 230 is installed at fixed locations at designated monitoring area 500 (e.g., parking lot) for monitoring activities occurring in parking lot 500. Such stationary monitoring devices 210 to 230 may be coupled to service server 100 through communication network 400 as shown in FIG. 1.

Service server 100 may control stationary monitoring devices 210 to 230 to capture images activities occurring at corresponding monitoring areas and transmit the captured images to service server 100. Service server 100 may receive the captured images and display the captured images through a desired display device. Alternatively, service server 100 may transmit the captured images to a designated device.

Entire parking lot 500 cannot be monitored with stationary monitoring devices 210 to 230 because each one of stationary monitoring devices 210 to 230 have a limited viewing angle and is installed at a corresponding fixed location. That is, target monitoring area 500 includes at least one of blind spots, for example, blind spots 510 and 520. That is, activities in parking spaces 510 and 520 cannot be monitored with stationary monitoring devices 210 to 230.

In order to monitor such blind spots, service server 100 may communicate with moving objects (e.g., car 310) and monitor activities in the blind spot (e.g., parking space 510) using an associated monitoring device (e.g., black box camera 311) mounted on moving objects in accordance with at least one embodiment. Particularly, service server 100 may detect moving objects near to a target blind spot to monitor. Such detection may be performed based on information collected from moving objects, regularly or upon generation of a predetermined event. Such moving objects may be registered as member moving objects and include monitoring devices for monitoring a target area.

Service server 100 may control such detected moving objects to collect information on activities occurring in target blind spots. For example, service server 100 may detect car 310 as a moving object located near to blind spot 510 based on information collected from car 310. Service server 100 may establish a communication link to car 310 and transit a control signal to car 310 to control camera 310 (e.g., monitoring device) mounted on car 310. That is, service server 100 may control camera 310 to capture images of activities occurring in parking space 510 and to transmit the captured images to service server 100 in accordance with at least one embodiment.

For another example, service server 100 may obtain location information on at least one blind spot in associated monitoring areas. Such location information on at least one blind spot may include global positioning system (GPS) information. Furthermore, service server 100 may collect information on moving objects, registered at service server 100, regularly or in response to a request. Such collected information may also include location information of the moving objects. When service server 100 receives a request message to monitor such blind spot from a service requester through user equipment, service server 100 may search for at least one moving object located near to the blind spot based on the location information of the blind spot and the collected information from the moving objects. If service server 100 detects at least one moving object located near to the blind spot, service server 100 may control the detected moving object to monitor the blind spot.

As described, a moving object located near to a blind spot may be controlled to monitor activities in the blind spot in accordance with at least one embodiment. Hereinafter, such operation of a service server will be described with reference to FIG. 3. For convenience and ease of understanding, operation of the service server will be described as monitoring activities in a parking lot using a camera mounted on a vehicle, but the present invention is not limited thereto.

Figure 3:
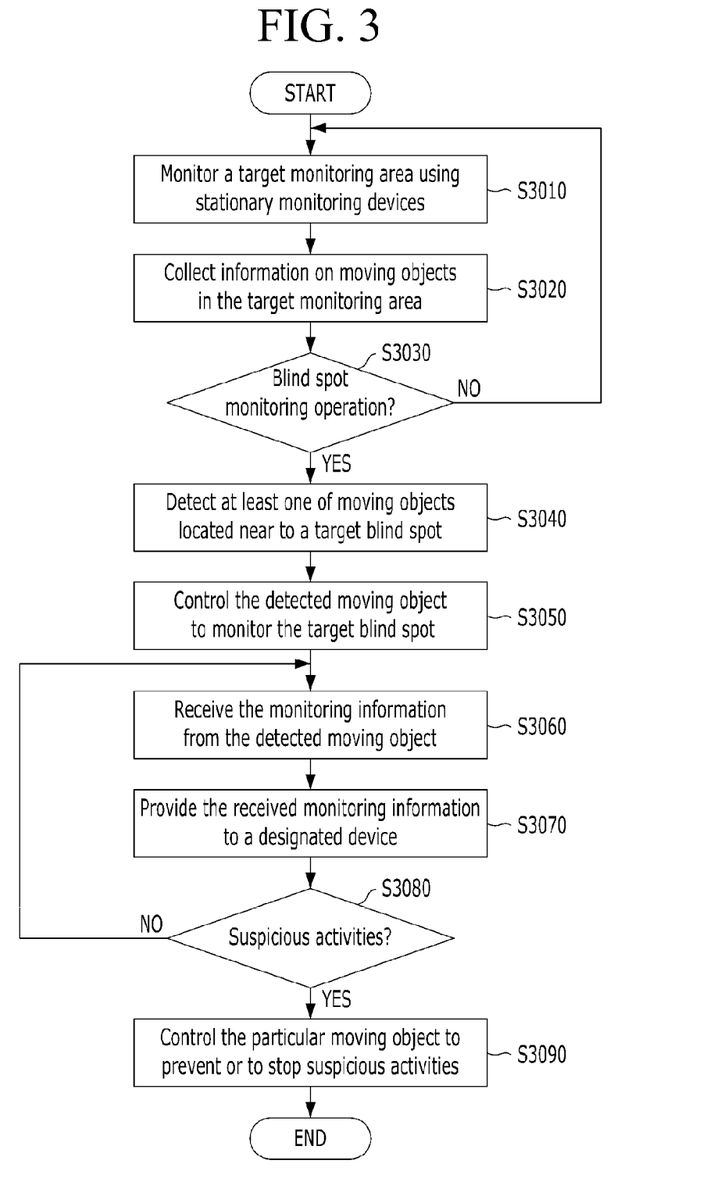
FIG. 3 illustrates operation of a server for monitoring activities in a blind spot using monitoring devices mounted on moving objects in accordance with at least one embodiment.

FIG. 3 illustrates operation of a server for monitoring activities in a blind spot using monitoring devices mounted on moving objects in accordance with at least one embodiment.

Referring to FIG. 3, service server 100 may monitor a target monitoring area using stationary monitoring devices installed at corresponding fixed locations at step S3010. For example, service server 100 may monitor activities in parking lot 500, as the target monitoring area, using surveillance cameras 210 to 230 immovably installed at fixed locations in the parking lot.

At step S3020, service server 100 may collect information on moving objects in the target monitoring area, regularly or upon generation of a predetermined event. For example, moving object 310 may regularly transmit information to service server 100. Alternatively, moving object 310 may transmit the information upon generation of a predetermined event. The predetermined event may include reception of a request message from service server 100. The information may include information on identification of a moving object, a currently location of a moving object, an operation status (e.g., activated, inactivated, power-on/off, phase, and so forth) of a moving object, and information on a mounted monitoring device.

At step S3030, service server 100 may determine whether a blind spot monitoring operation is initiated upon the generation of a predetermined event. For example, the predetermined event for initiating the blind spot monitoring operation may include detecting a vehicle parking at the blind spot and detecting a predetermined sequence of signals generated by a vehicle. That is, when service server 100 detects a target object to monitor enters into the blind spot, the blind spot monitoring operation may be initiated.

When the blind spot monitoring operation is not initiated (No—S3030), service server 100 may continue monitoring the target monitoring area using stationary monitoring devices at step S3010. For example, when service server 100 determines no target object to monitor enters into the blind spot, service server 100 may use surveillance cameras installed at fixed locations to monitor the target monitoring area.

When the blind spot monitoring operation is initiated (Yes—S3030), service server 100 may detect at least one of moving objects located near to a target blind spot to monitor at step S3040. For example, when service server 100 determines a target object to monitor enters into the blind spot, service server 100 detect moving objects located near to the target blind spot based on information regularly collected from moving objects. As shown in FIG. 2, service server 100 detects car 310 located near to blind spot 510 based on the location information transmitted from car 310.

At step S3050, service server 100 may control the detected moving object to monitor the target blind spot using a monitoring device mounted on the detected moving object. For example, as shown in FIG. 2, service server 100 transmits a control signal to car 310 located near to blind spot 510 or camera 311 mounted on car 310 to capture images of activities occurring in blind spot 510. In response to the control signal, car 310 or camera 311 captures images and transmits the captured images to service server 100 in real time. For convenience and ease of understanding, images will be described as monitoring result, but the present invention is not limited thereto. The monitoring result may also include sound, temperature, vibration, and so forth.

At step S3060, service server 100 may receive the monitoring information, as monitoring result, from the detected moving object. For example, service server 100 receives captured images from car 310 or directly from camera 311 through communication network 400.

At step S3070, service server 100 may provide the received monitoring information to a designated device. For example, service server 100 displays the received images through a display device, but the present invention is not limited thereto. Service server 100 may deliver the received image to designated user equipment and the designated user equipment may display the received image. In addition, service server 100 may also output sounds included in the received monitoring information through a corresponding output device.

At step S3080, service server 100 may determine whether suspicious activities occur in the target monitoring area based on the obtained monitoring information. For example, service server 100 may analyze images to detect suspicious activities, such as robbing, stealing, beating, kidnapping, or a man with a mask, a man with a gun, and a wanted man.

When suspicious activities are not detected (No—S3080), service server 100 may continuously receive the monitoring information at step S3060. When suspicious activities are detected (Yes—S3080), service server 100 may control the particular moving object to generate a horn sound or to turn on head light in order to prevent or to stop suspicious activities in the target monitoring area at step S3090. For example, when service server 100 detects the suspicious activities, service server 100 transmits a control signal to car 310. In response to the control signal, car 310 controls predetermined constituent elements, for example, activating a horn, to turn on a radio, to turn on a head lamp, and so forth. Such activation may prevent or stop suspicious activities.

As described, a moving object may be used to monitor a blind spot in accordance with at least one embodiment.

Hereinafter, such operation of the moving object will be described with reference to FIG. 4.

Figure 4:
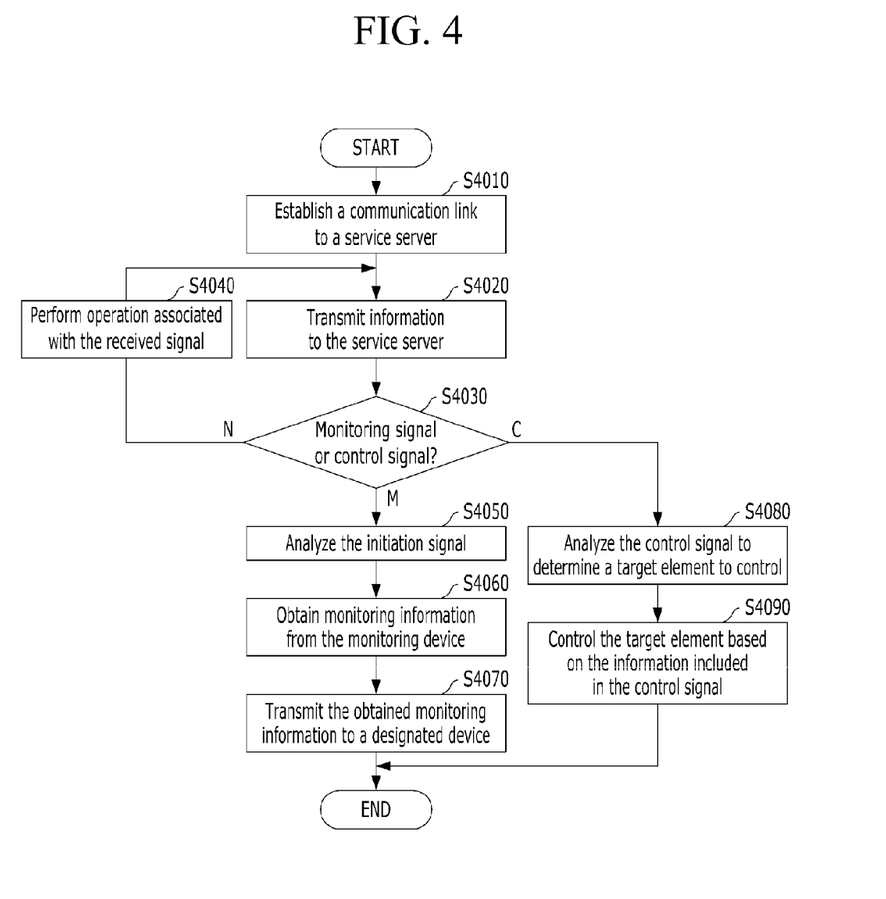
FIG. 4 illustrates an operation of a moving object for monitoring a blind spot using a monitoring device mounted thereon in accordance with at least one embodiment.

FIG. 4 illustrates an operation of a moving object for monitoring a blind spot using a monitoring device mounted thereon in accordance with at least one embodiment.

Referring to FIG. 4, a moving object may establish a communication link to a service server associated with a monitoring area where the moving object is currently located upon the generation of a predetermined event. For example, car 310 may establish a communication link to service server 100 when car 310 enters a service zone of service server 100. Such operation may be initiated by a broadcasting signal (e.g., a pilot signal) from service server 100, but the present invention is not limited thereto.

At step S4020, the moving object may transmit information to the service server regularly or upon the generation of a predetermined event. For example, after establishing a communication link to service server 100, car 310 may transmit information thereof to service server 100 regularly or in response to a request signal from service server 100. The information may include identification of car 310, a current location of car 310 in parking lot 500, information on camera 311 mounted on car 310, and a current operation status of car 310 or camera 311, such as activated, inactivated, power-on/off, phase, and so forth.

At step S4030, the moving object may determine whether a received signal is a monitoring signal for monitoring a target blind spot or a control signal for controlling at least one constituent element of the moving object. For example, car 310 may receive various types of signals from service server 100. That is, car 310 may receive a monitoring signal to initiate a monitoring operation and a control signal to control at least one constituent element of car 310.

When the received signal is not the monitoring signal or the control signal (No—S4030), the moving object may perform operation associated with the received signal at step S4040 and transmit information to the service server regularly at step S4020. For example, when the received signal is a typical signal for a predetermined operation (e.g., a request signal for predetermined information), car 310 performs an operation associated with the received signal.

When the received signal is the monitoring signal (M—S4030), the moving object may analyze the monitoring signal to determine a target monitoring area (e.g., a blind spot), a monitoring time duration, a destination to transmit the monitoring result, and so forth at step S4050. For example, when the received signal is the monitoring signal, car 310 extracts information for monitoring a target object from the monitoring signal. Based on the extracted information, car 310 may determine that a target element to control is camera 311, a target monitoring area is blind spot 510 and a destination of the monitored information is service server 100. The present invention, however, is not limited thereto. For example, the destination of the monitored information may be user equipment of a service requester, and the information in the monitoring signal may further include information on a monitoring time period, such as five hours, ten hours, and so forth.

At step S4060, the moving object may obtain monitoring result information from the monitoring device. For example, car 310 may control camera 311 to capture images of activities occurring in blind spot 510 and collect the captured images from camera 311, but the present invention is not limited thereto. Car 310 may control constituent elements to collect information on sound, temperature, and vibration in the target monitoring area.

At step S4070, the moving object may transmit the obtained monitoring information to a designated device. For example, car 310 may transmit the captured images to service server 100, but the present invention is not limited thereto. Car 310 may transmit the captured images to a designated device, such as service server 100 and user equipment of a service requester. Such information on the designated device may be included in the control message or the monitoring message.

When the received signal is the control signal (C—S4030), the moving object may analyze the control signal to determine a target element to control at step S4080. For example, when car 310 receives the control signal, car 310 extracts control information from the control signals. Such extracted control information may include information on a target element to control, a control data to control the target element, a control time period, and so forth. For example, the extracted control information may include information on a head light as the control element, control data for flicking the head light, and 10 minutes as the control time period.

At step S4090, the moving object control the target element based on the information included in the control signal. For example, car 310 controls the head light to be flicked for 10 minutes based on the extracted control information.

As described, service server 100 may use various methods for determine whether a blind spot needs to be monitored. Such operations will be described with reference to FIG. 5 to FIG. 7. For convenience and ease of understanding, such operation will be described to recognize a vehicle parked in a blind spot, but the present invention is not limited thereto.

Figure 5:
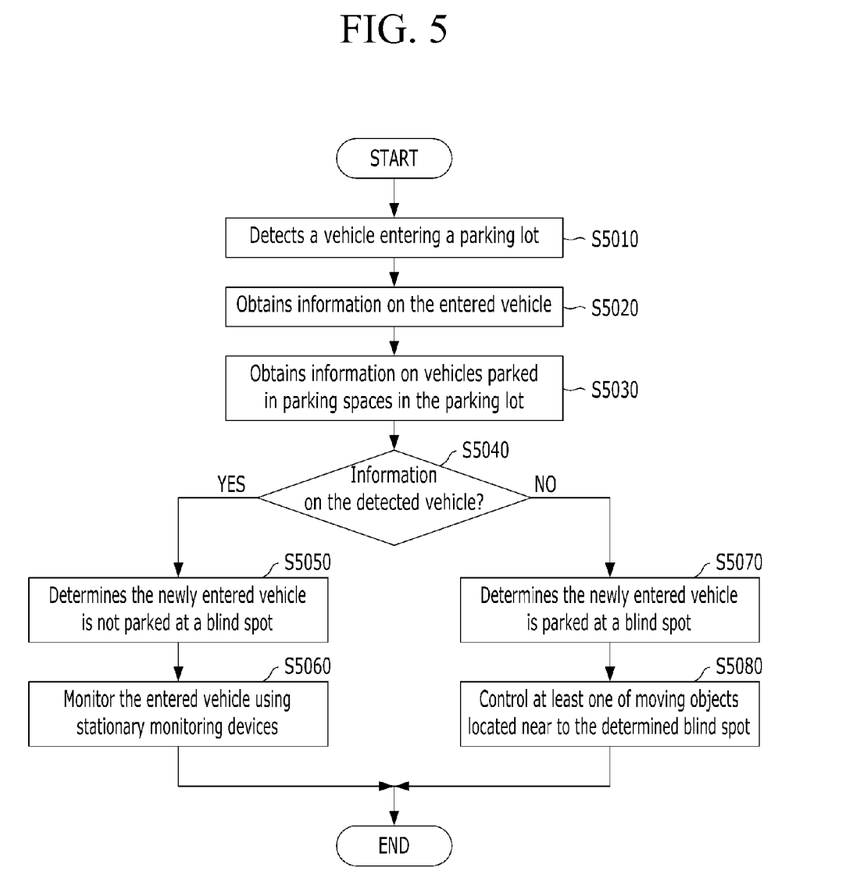
FIG. 5 illustrates recognizing a vehicle parked in a blind spot in accordance with at least one embodiment.

FIG. 5 illustrates recognizing a vehicle parked in a blind spot in accordance with at least one embodiment.

At step S5010, service server 100 detects a vehicle entering parking lot 500 (e.g., target monitoring area). Such detection may be performed based on an image captured by at least one of stationary monitoring devices 210 to 230.

At step S5020, service server 100 obtains information on the entered vehicle based on the captured image. Service server 100 analyzes the captured image and obtains the information on the entered vehicle, such as a license plate number, a type of a car, a color of a car, a time of entering parking lot 500, a speed, and so forth.

At step S5030, service server 100 obtains information on vehicles parked in parking spaces in parking lot 500. Service server 100 obtains information on vehicles that area already parked in parking lot 500. Such information of other vehicles may be stored in a database of service server 100 when the other vehicles entered and parked in parking lot 500.

At step S5040, service server 100 determines whether the obtained information of parked vehicles includes information on the newly entered vehicle. For example, service server 100 compares information on the newly entered vehicle with the information of vehicles already parked in parking lot 500.

When the obtained information includes information on the newly entered vehicle (Yes—S5040), service server 100 determines the newly entered vehicle is not parked at blind spot 510 or 520 at step S5050 and monitors the entered vehicle using stationary monitoring devices at step S5060.

When the obtained information does not include information on the newly entered vehicle (No—S5040), a service server determines the newly entered vehicle is parked at blind spot 510 or 520 at step S5070. At step S5080, service server 100 controls at least one of moving objects, such as car 310, located near to blind spot 510 and monitors activities occurring in blind spot 510.

Figure 6:
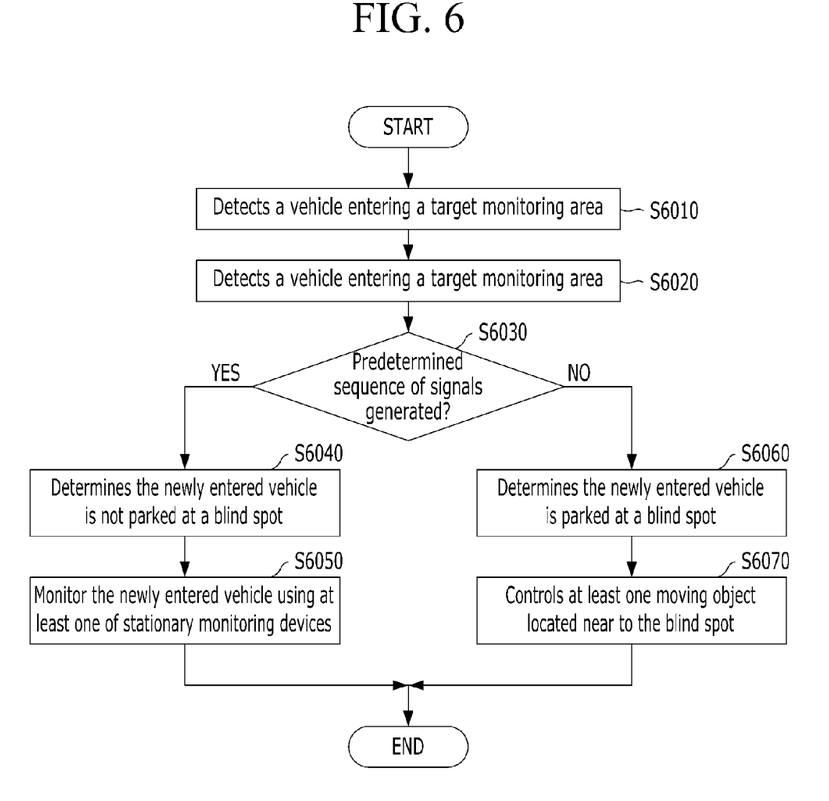
FIG. 6 illustrates recognizing a vehicle parked in a blind spot in accordance with another embodiment.

FIG. 6 illustrates recognizing a vehicle parked in a blind spot in accordance with another embodiment At step S6010, service server 100 detects a vehicle entering parking lot 500 (e.g., target monitoring area). Such detection may be performed based on an image captured by at least one of stationary monitoring devices 210 to 230.

At step S6020, service server 100 obtains information on the entered vehicle based on the captured image. Service server 100 analyzes the captured image and obtains the information on the entered vehicle, such as a license plate number, a type of a car, a color of a car, a time of entering parking lot 500, a speed, and so forth.

At step S6030, service server 100 determines whether a predetermined sequence of signals generated by the entered vehicle is detected through at least one of stationary monitoring devices 210 to 230. For example, a vehicle entering parking lot 500 and parking one of spaces in parking lot 500 may be programmed to generate a unique signal, such as two time flicking of a head light. Service server 100 may detect such a unique signal using stationary monitoring devices 210 to 230 to determine a parking space of each vehicle entered parking lot 500.

When the predetermined sequence of signals is detected (Yes—S6030), a service server determines the newly entered vehicle is not parked at a blind spot at step S6040. The service server monitors the newly entered vehicle using at least one of stationary monitoring devices at step S6050.

When the predetermined sequence of signals is not detected (No—S6030), a service server determines the newly entered vehicle is parked at a blind spot at step S6060. The service server controls at least one moving object located near to the blind spot to monitor the newly entered vehicle at step S6070.

Figure 7:
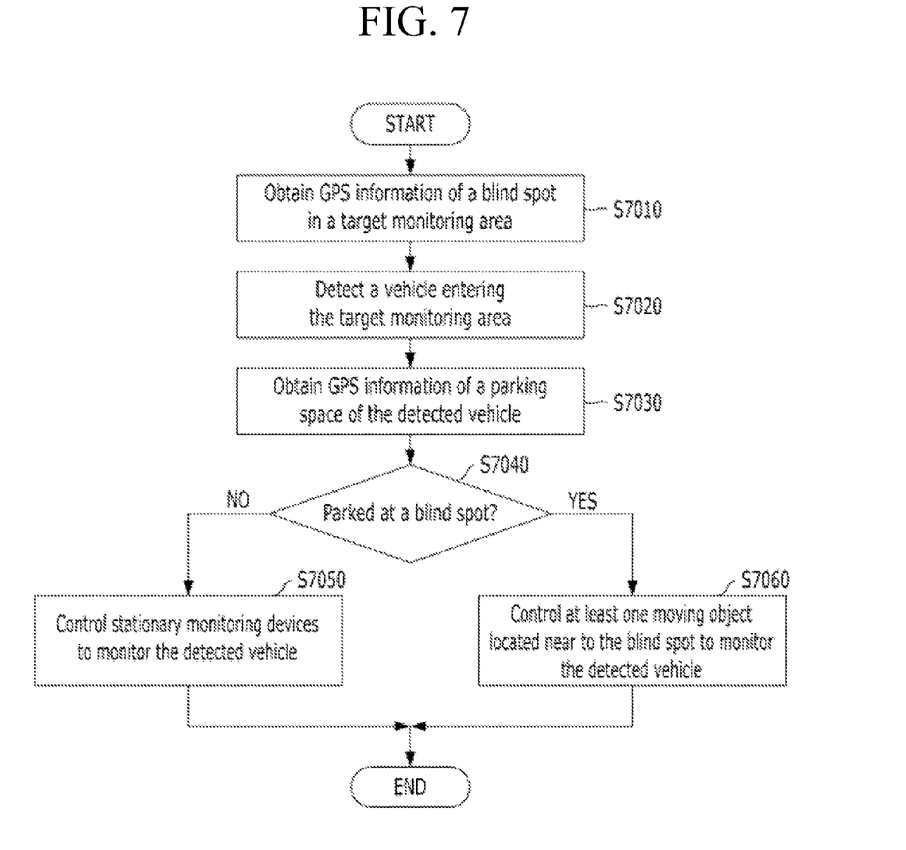
FIG. 7 illustrates recognizing a vehicle parked in a blind spot in accordance with still another embodiment.

FIG. 7 illustrates recognizing a vehicle parked in a blind spot in accordance with still another embodiment.

Referring to FIG. 7, service sever 100 may detect or obtain GPS information of each spot in parking lot 500 including blind spots 510 and 520 at step S7030. Service server 100 may store such GPS information in a database thereof.

At step S7020, service server 100 detects a vehicle entering parking lot 500 (e.g., target monitoring area). Such detection may be performed based on an image captured by at least one of stationary monitoring devices 210 to 230.

At step S7030, service server 100 obtains GPS information of a parking space of the detected vehicle. That is, the entered vehicle may generate GPS information of a current location after parked and transmit the generated GPS information to service server 100.

At step S7040, service server 100 determines whether the parking space of the detected vehicle is a blind spot based on the obtained GPS information. That is, service server 100 compares the GPS information of the parking space where the entered vehicle is parked with the GPS information of blind spots 510 and 520.

When the parking space is not the blind spot (No—S7040), service server 100 controls stationary monitoring devices 210 to 230 to monitor the detected vehicle at step S7050. When the parking space is the blind spot (Yes—S7040), service server 100 controls at least one moving object located near to the blind spot to monitor the detected vehicle at step S7060.

As described, service server 100 may collect images captured by stationary monitoring device 200 and moving object camera 310 and provide the collected image to a designated device. Based on the collected images, activities occurring in a target monitoring area, including a blind spot, may be monitored. Such service server 100 will be described with reference to FIG. 8.

Figure 8:
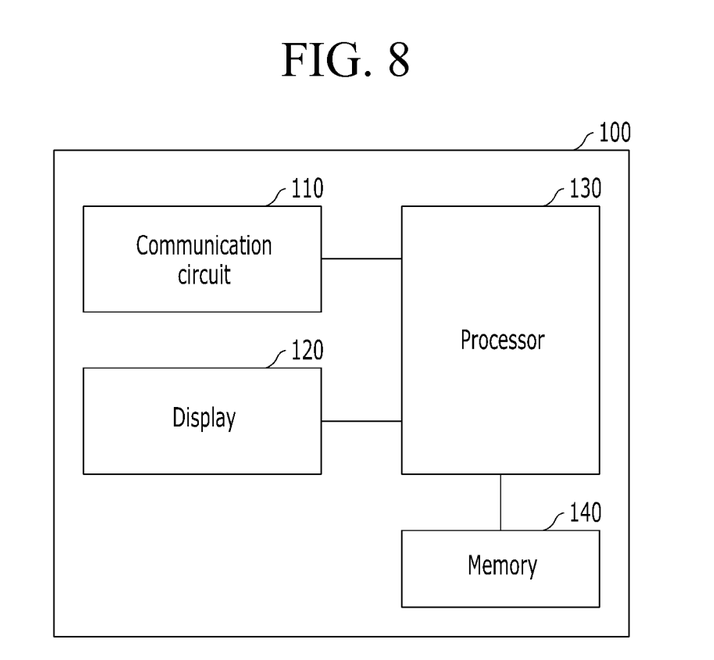
FIG. 8 illustrates a service server in accordance with at least one embodiment.

FIG. 8 illustrates a service server in accordance with at least one embodiment.

Referring to FIG. 8, service server 100 may include communication circuit 110, display 120, processor 130, and memory 140.

Communication circuit 110 may perform operation for communicating with other entities coupled through communication network 400. For example, communication circuit 110 may transmit data to or receive data from stationary monitoring devices 210 to 230 and moving objects 310 to 340 through communication network 400.

For example, communication circuit 110 may transmit a control signal to at least one of stationary monitoring device 200 and moving object camera 310 and receive images captured by at least one of stationary monitoring device 200 and moving object camera 310.

Display 120 may be a device for displaying various types of information, such as text, character, and images. Display 120 may display images captured by at least one of stationary monitoring devices 210 to 230 and moving objects 310 to 340, which are received through communication circuit 310.

Processor 130 may perform operations for controlling constituent elements of service server 100 to monitor a target monitoring area using at least one moving objects in accordance with at least one embodiment.

For example, processor 130 may perform operations to select at least one moving object cameras located near to a blind spot upon generation of a predetermined event, to control the selected at least one moving object cameras, and to collect images of activities occurring in the blind spot.

That is, processor 130 may perform operations for monitoring a blind spot in a public place not only using at least one of stationary monitoring devices 210 to 230 but also using cameras 311 to 341 mounted on moving objects 310 to 340. Processor 130 may provide monitoring results to a designated device through communication circuit 110.

Processor 130 may perform operations for controlling moving objects 310 to 340 to obtain information on activities occurring in a target monitoring area (e.g., a blind spot) and for collecting the obtained information from moving objects 310 to 340 in real time through communication circuit 110. Based on the collected information, processor 130 may select moving objects located near to a target monitoring area (e.g., blind spot) and transmit a control signal to the selected moving object through communication circuit 110. Through such control signals, processor 130 may control the selected moving objects to capture images of activities occurring in the target monitoring area (e.g., a blind spot) using associated cameras 311 to 341 and to transmit the captured images to service server 100.

Processor 130 may perform operation for providing the monitoring result to a designated device after authenticating a service requester. Furthermore, processor 130 may perform operation for enabling moving objects 310 to 340 to register for the blind spot monitoring service.

Furthermore, processor 130 may perform operation for detecting locations of moving objects 310 to 340. Particularly, processor 130 may detect a location of a moving object located near to a target monitoring area (e.g., a blind spot).

For example, processor 130 may determine a location of a vehicle parked in a target parking area using images captured by stationary monitoring devices located at the target parking area and information on the vehicle entering the target parking area. When processor 130 may be unavailable to detect a location of a vehicle parked in a target parking area using the captured image and the obtained information, processor 130 may determine the vehicle is parked at a blind spot in the target parking area.

As another example, processor 130 may detect a vehicle generating a predetermined signal through constituent elements such as a head light or a direction indication light when the vehicle enters a target monitoring area (e.g., parking area) or when the vehicle is parked at a parking space. When processor 130 cannot detect a location of the vehicle through stationary monitoring devices, processor 130 may determine that the vehicle is parked at a blind spot.

Furthermore, processor 130 may detect a location of a vehicle based on GPS information transmitted from a moving object. For example, processor 130 may determine whether a vehicle is in a blind spot based on the GPS information transmitted from the moving object and GPS information of the blind spot.

Memory 140 may store various types of data for operating constituent elements of service server 100 and for monitoring a target monitoring area using at least one moving object.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of monitoring a blind spot of stationary monitoring devices in a target monitoring area using a moving object in the target monitoring area by a service server, the method comprising:

monitoring the target monitoring area using the stationary monitoring devices and collecting information on moving objects in the target monitoring area based on first monitoring result of the stationary monitoring devices and signals from the moving objects;

upon generation of a predetermined initiation event, detecting one from the moving objects based on the collected information and the signals, wherein the detected one is a moving object that has a predetermined monitoring device and is located in or within a predetermined distance from the blind spot of the stationary monitoring devices in the target monitoring area; and monitoring a target object in the blind spot of the stationary monitoring devices using the predetermined monitoring device mounted on the detected one moving object.

2. The method of claim 1, wherein the monitoring and collecting comprises:

detecting the target object entering the target monitoring area using the stationary monitoring device;

obtaining information on the target object based on images captured by the stationary monitoring devices and signals from the target object, and collecting images of the target monitoring area from the stationary monitoring devices at a predetermined interval;

comparing the captured images of the target monitoring area to find the target object in the captured images based on the obtained information; and determining the generation of the predetermined initiation event based on the comparing result.

3. The method of claim 1, wherein the generation of the predetermined initiation event is determined when the target object is located at the blind spot of the stationary monitoring device based on analysis of images captured by the stationary monitoring devices.

4. The method of claim 1, wherein the generation of the predetermined initiation event is determined when a predetermined signal generated from the target object is detected based on analysis of images captured by the stationary monitoring devices.

5. The method of claim 2, wherein the comparing comprises:

finding the target object in the captured images by comparing the captured images and analyzing the obtained information of the target object; and determining the target object is located in the blind spot of the stationary monitoring device when the target object is not in at least one of the captured images after the target object enters the target monitoring area.

6. The method of claim 1, wherein the detecting comprises:

extracting current location information of the moving objects from the collected information;

determining a distance from the blind spot of the stationary monitoring devices to each of the moving objects; and detecting, from the moving objects, one that includes the predetermined monitoring device and located within a predetermined distance from or in the blind spot.

7. The method of claim 6, wherein the collected information on the moving objects include information on at least one of identification, a current location, a monitoring device, and an operation status.

8. The method of claim 1, wherein the monitoring comprises:

transmitting a monitoring signal to the detected moving object;

receiving monitoring results from the detected moving object in response to the monitoring signal.

9. The method of claim 8, wherein the monitoring signal includes information on the target object to monitor, a target blind spot to monitor, a monitoring time duration, and a destination to provide monitoring results.

10. The method of claim 8, wherein the monitoring results include at least one of images, moving images, audio data, temperature data, and vibration data, captured and sensed through various devices of the detected moving object.

11. The method of claim 1, comprising:

receiving the monitoring result from the detected moving object; and outputting the received monitoring result through constituent elements of the service server.

12. The method of claim 1, comprising:

receiving the monitoring result from the detected moving object; and transmitting the received monitoring result to a designated device through a communication network.

13. The method of claim 1, wherein the monitoring comprising:

transmitting, to the detected moving object, a signal to control a camera of the detected-moving object to capture images of activities occurring in the blind spot of the stationary monitoring devices; and receiving images captured by the camera of the detected moving object and transmitted from the detected moving object in response to the signal.

14. The method of claim 1, comprising, after the monitoring;

determining whether a predetermined activity of the target object occurs in the blind spot based on the monitoring result from the detected moving object.

15. The method of claim 14, wherein the determining whether a predetermined activity occurs comprises:

analyzing images of activities of the target object occurring in the blind spot, captured by a camera of the detected moving object and transmitted from the detected moving object.

16. A method of monitoring, by a service server, a blind spot of stationary monitoring device in a target monitoring area by using a moving object in the target monitoring area, the method comprising:

detecting a moving object within a predetermined distance from a blind spot of the stationary monitoring device;

monitoring the blind spot of the stationary monitoring devices in the target monitoring area in response to a signal from the service server for monitoring the target monitoring area; and transmitting the monitoring result to a designated device, wherein the monitoring comprises:

receiving a monitoring signal from the service server;

obtaining monitoring information from the received monitoring signals; and controlling a camera mounted on the detected moving object to capture images of activities occurring in the blind spot based on the obtained monitoring information.

17. The method of claim 16, wherein the monitoring comprising:

receiving a control signal from the service server;

obtaining controlling information from the received control signal; and controlling at least one constituent element of the detected moving object based on the obtained controlling information.

18. The method of claim 16, comprising:

establishing a communication link to the service server when the moving object enters the target monitoring area associated with the service server; and transmitting information on the detected moving object to the service server.

* * * * *